US010858797B2

(12) United States Patent
Jussel et al.

(10) Patent No.: US 10,858,797 B2
(45) Date of Patent: Dec. 8, 2020

(54) METHOD OF RECOGNIZING OBSTACLES ON OPERATION OF A VIBRATORY PILE DRIVER

(71) Applicant: Liebherr-Werk Nenzing GmbH, Nenzing (AT)

(72) Inventors: Patrick Jussel, Bludenz (AT); Peter Loster, Mitterfels (DE)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 187 days.

(21) Appl. No.: 15/905,498

(22) Filed: Feb. 26, 2018

(65) Prior Publication Data
US 2018/0245303 A1 Aug. 30, 2018

(30) Foreign Application Priority Data

Feb. 27, 2017 (DE) .......................... 10 2017 001 877

(51) Int. Cl.
E02D 7/10 (2006.01)
G01P 15/16 (2013.01)
G01P 3/52 (2006.01)
G01P 3/54 (2006.01)
E02D 13/06 (2006.01)
E02D 7/18 (2006.01)

(52) U.S. Cl.
CPC ............... *E02D 7/10* (2013.01); *E02D 7/18* (2013.01); *E02D 13/06* (2013.01); *G01P 3/52* (2013.01); *G01P 3/54* (2013.01); *G01P 15/16* (2013.01)

(58) Field of Classification Search
CPC .. E02D 13/06; E02D 7/10; E02D 7/18; G01P 15/16; G01P 3/52; G01P 3/54
See application file for complete search history.

(56) References Cited

U.S. PATENT DOCUMENTS

| 3,352,369 | A | * | 11/1967 | Bodine, Jr. | ............... E02D 7/18 175/56 |
| 5,375,664 | A | * | 12/1994 | McDowell | ............... E02D 7/02 173/1 |
| 6,301,551 | B1 | * | 10/2001 | Piscalko | ............... E02D 13/06 340/853.8 |
| 2007/0074881 | A1 | * | 4/2007 | Bermingham | ............ E02D 7/02 173/2 |

(Continued)

FOREIGN PATENT DOCUMENTS

| DE | 3707648 | * | 3/1987 | ............... E02D 1/02 |
| DE | 3707648 A1 | | 11/1988 | |
| DE | 19631992 A1 | | 2/1998 | |

Primary Examiner — Andrew M Tecco
Assistant Examiner — Nicholas E Igbokwe
(74) Attorney, Agent, or Firm — McCoy Russell LLP

(57) ABSTRACT

A method of recognizing obstacles on operation of a vibratory pile driver of a work machine includes monitoring an acceleration signal of the vibratory pile driver during operation of the vibratory pile operator and analyzing the acceleration signal to determine the presence of an obstacle. The acceleration signal may be monitored over a time period which is determined based on an excitation frequency of the vibratory pile driver. The analysis may include comparing negative and positive half-waves of the acceleration signal. Responsive to the analysis indicating an obstacle, a system operator may be alerted, and/or operation of the vibratory pile driver may be adjusted via controller intervention.

17 Claims, 3 Drawing Sheets

(56) References Cited

U.S. PATENT DOCUMENTS

| | | | | |
|---|---|---|---|---|
| 2009/0146514 A1* | 6/2009 | Heichel | .................. | B06B 1/166 |
| | | | | 310/81 |
| 2009/0188687 A1* | 7/2009 | Heichel | .................. | B06B 1/166 |
| | | | | 173/49 |
| 2009/0189467 A1* | 7/2009 | Heichel | .................. | B06B 1/166 |
| | | | | 310/81 |
| 2010/0065437 A1* | 3/2010 | Gruhn | ..................... | B23H 3/02 |
| | | | | 205/641 |
| 2011/0056750 A1* | 3/2011 | Lucon | ....................... | E21B 7/24 |
| | | | | 175/56 |
| 2011/0313724 A1* | 12/2011 | Dalton | ................... | G01B 21/18 |
| | | | | 702/166 |
| 2012/0123735 A1* | 5/2012 | Kimishima | ............ | G01C 21/20 |
| | | | | 702/160 |

* cited by examiner

METHOD OF RECOGNIZING OBSTACLES ON OPERATION OF A VIBRATORY PILE DRIVER

CROSS REFERENCE TO RELATED APPLICATION

This application claims priority to German Patent Application No. 10 2017 001 877.4, entitled "Method of Recognizing Obstacles on Operation of a Vibratory Pile of Driver," filed Feb. 27, 2017, the entire contents of which is hereby incorporated by reference in its entirety for all purposes.

TECHNICAL FIELD

The present disclosure relates to a method of recognizing obstacles on operation of a vibratory pile driver, to a corresponding vibratory pile driver, and to a work machine having a vibratory pile driver.

BACKGROUND AND SUMMARY

When driving in a driving element by a leader-guided vibratory pile driver, with the leader being directly attached to a work machine, obstacles such as boulders or rock formations represent a great problem in which the clamping grips, the vibrator, and subsequently the leader can cause damage to different machine parts due to the feedback via the driving element (e.g. sheet pile wall). Said components can also be damaged themselves. This process can be physically described as an inelastic impact in which the energy of the vibrations and the drive force are not applied as intended for the driving, but are fed back to the machine.

There has previously not been any reliable warning system that warns the operator of a corresponding risk in an automated manner and in good time. A fast reaction by the operator is therefore necessary to stop the driving in good time to avoid damage.

It can be necessary in another application that a driving element is driven into a rock, for instance, such that the stability is ensured. The operator vibrates the pipe for so long until the pipe is at the rock and exerts a pressure onto the pile for so long more until the amplitude of the vibrator is at a maximum. Although the pile has already been in contact with the rock for some time, the system is still further loaded for a long time until the machine is in contact. The machine can thereby be very heavily loaded on a sustained basis.

Against this background, it is the object of the present disclosure to provide an improved method of recognizing obstacles on operation of a vibratory pile driver and a corresponding apparatus to perform the method by means of which apparatus a less damaging operation is possible.

This object may be achieved by detecting acceleration signals of the vibratory pile driver and analyzing the acceleration signals, with the analysis comprising the comparison of negative and positive half-waves.

The half-waves can represent the detected acceleration signals or can be derived from the detected acceleration signals. The compared half-waves can further be mutually adjacent half-waves.

It is conceivable in an embodiment of the present disclosure that the analyzing comprises the determination of the speed and/or of the amplitude of the vibratory pile driver. The speed and/or the amplitude can here be determined by integration of the acceleration signal or of the acceleration signals. The frequency of the vibratory pile driver can also be determined from the acceleration signals. The detected acceleration signal can here be detected by an accelerometer that determines the acceleration in at least one direction, in particular in the direction of the pile driving progress.

It is conceivable in a further embodiment that the acceleration signals are detected by means of at least one acceleration sensor or accelerometer at the vibratory pile driver and/or at a leader and/or driving element coupled to the vibratory pile driver.

It is furthermore conceivable in a further embodiment that the detection takes place via an adjustable observation time period, with the observation time period in particular being able to be selected in dependence on the excitation frequency. The excitation frequency can here be the frequency of the vibratory pile driver.

It is conceivable in a further embodiment that the comparison of the negative and positive half-waves comprises the comparison of measurements such as the area, the amplitude, and/or the shape, with the shape in particular being able to be the full width at half maximum of the half-waves. A plurality of corresponding comparisons can naturally also be meant in the present case.

It is conceivable in a further embodiment that the analyzing comprises the search for critical frequencies such as in particular resonant frequencies by means of a frequency analysis.

Provision can further be made in a further embodiment that the analyzing comprises the analysis of the harmonic factor.

It is further conceivable in a further embodiment that the method comprises outputting a signal in dependence on the analyzing. The output signal can here be a control and/or display signal. A control signal can control the vibratory pile driver or a device coupled to it, for example, to protect the vibratory pile driver. The vibratory pile driver can here, for example, be slowed down or stopped. A display that indicates to an operator of the vibratory pile driver that an obstacle has been recognized in accordance with the method can, for example, light up as an information signal. It is hereby accordingly made possible for the operator to react accordingly to the obstacle recognized at an early point in time. The signal is naturally output when the analysis indicates that an obstacle has been recognized.

Further details and advantages of the present disclosure will be shown with reference to the Figures.

DETAILED DESCRIPTION

Figure 1:
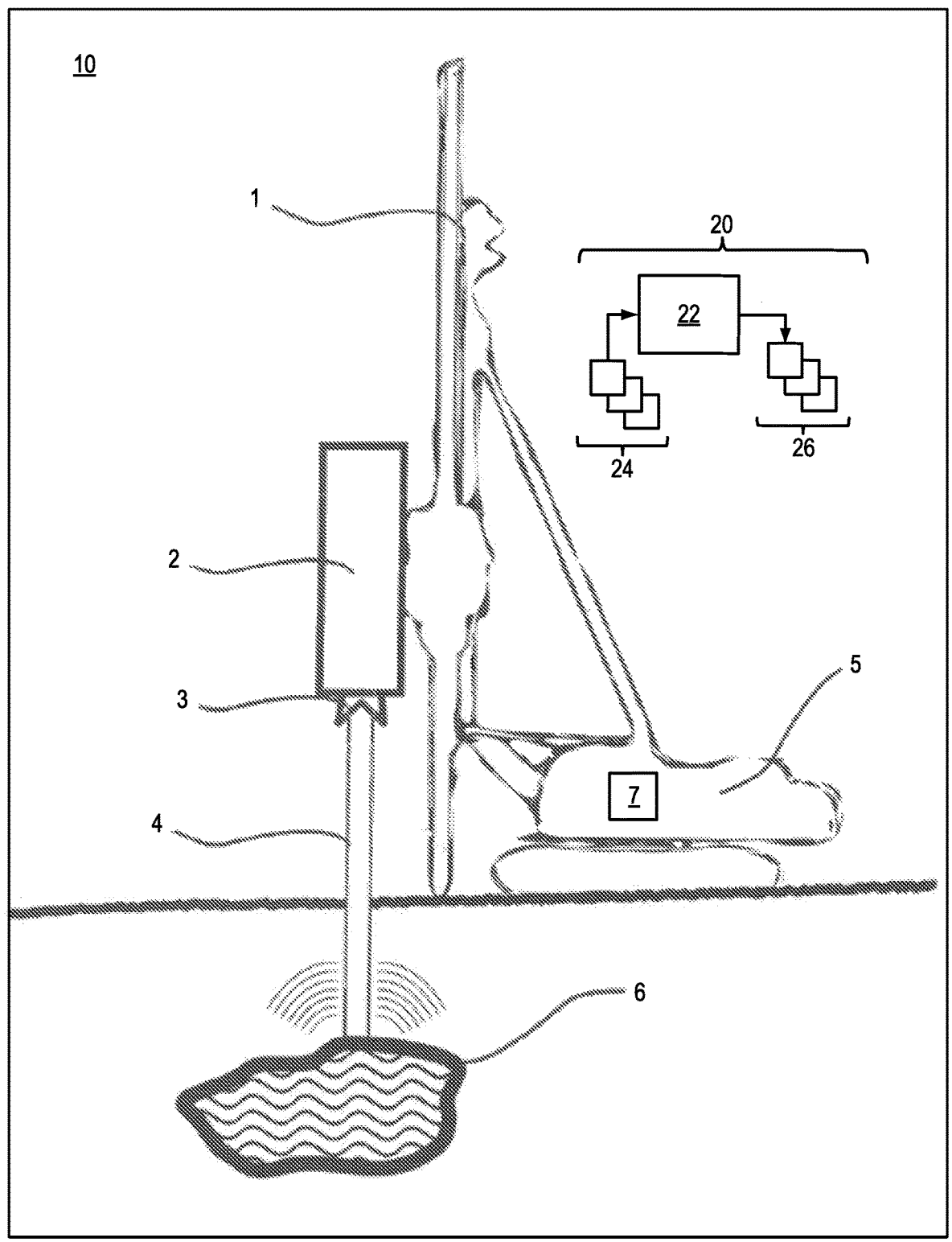
FIG. 1 shows a schematic view of a system including a work machine and a vibratory pile driver on the carrying out of a method in accordance with the present disclosure.

FIG. 1 schematically shows a system 10 including a work machine 5 (alternatively referred to as a carrier machine), a vibratory pile driver 2, and a control system 20 configured to control the system and the components thereof. Vibratory pile driver 2 is fastened to a leader 1 and transmits vibrations via clamping grips 3 to a driving element 4, for example a sheet pile wall, a pipe, or other elements. The work machine or carrier machine 5 has the task of holding the leader, to press the vibratory pile driver down (or to pull it up, which is, however, not relevant here) via a hoisting winch or another system (for instance a hydraulic system) by a feed force Fv along the leader and to control the vibratory pile driver via the hydraulic system. In the depicted example, work machine 5 includes a hydraulic system 7, and the vibratory pile driver is driven by the hydraulic system (e.g., hydraulic motors of the vibratory pile driver are driven by the hydraulic system). The driving element can impact an obstacle 6 during the driving in, which can result in damage to the vibrator, to the leader, and/or to the carrier machine.

Control system 20 includes an electronic controller 22 receiving information from a plurality of sensors 24 (various examples of which are described herein) and sending control signals to a plurality of actuators 26. In addition to the sensors described below, sensors 24 may further include one or more input devices configured to receive input from one or more system operators and send a signal to the controller based on the input (e.g., a signal indicating a desired excitation frequency of the vibratory pile driver). Actuators 26 may include the hydraulic system of the work machine, hydraulic motors of the vibratory pile driver (which may be driven by the hydraulic system of the work machine), a user interface of the work machine, etc. The controller receives input data from the various sensors, processes the input data, and triggers the actuators in response to the processed input data based on instruction or code programmed therein (e.g., in non-transitory memory of the controller) corresponding to one or more routines.

Controller 22 may be arranged at the work machine, at the vibratory pile driver, or at another location. The control system may alternatively include multiple controllers 22 (e.g., one at the vibratory pile driver and one at the work machine itself). Sensors 24 may include sensors disposed at the vibratory pile driver, work machine, and/or at other locations. Similarly, actuators 24 may include actuators disposed at the vibratory pile driver, work machine, and/or at other locations. The sensors, controller(s), and actuators may communicate wirelessly via a network in some examples.

Both the carrier machine and the vibratory pile driver can be equipped with sensors that permit the following measurements in ongoing operation at a sufficiently large scanning rate (at least 40 Hz): the feed force, the excitation vibration frequency, the excitation vibration amplitude, the feed speed, and/or the different hydraulic measurement parameters such as pressure, oil conveying amounts, etc. Sensors 24 may include such sensors.

In the normal vibration process, the driving element can be driven into the ground, with the ground material being displaced at the driving element tip due to the feed force and with resistance at the jacket and at the tip of the driving element being reduced by the vibrations. If the driving element tip now hits a huge obstacle that does not permit any displacement, an inelastic impact then takes place between the driving element and the obstacle instead of the displacement of the ground material. The kinetic energy can be transmitted to the vibrator in the form of a shock along the driving element.

These shocks are produced over and over again by the vibrations of the vibrator and propagate at a specific speed in dependence on the length of the driving element and the speed of sound in the material of the driving element and interact with the vibrator in a further progression. Interference arises in the excitation movement of the vibrator (the excitation imbalances can, for instance, be disturbed); superpositions of different frequencies arise; and in a further progression, additional low frequencies and high frequencies arise in the vibrator/driving element system. These frequencies can coincide with the actual frequency of the carrier machine or of the leader; that is, as a further consequence, large amplitudes can arise that can result in damage to the driving element, the vibrator, the leader, or the carrier machine.

Sensors 24 may further include a sensor already installed as standard in vibratory pile driver systems: an accelerometer that can determine the acceleration in at least one direction (in the direction of the driving progress). The speed and amplitudes can furthermore be determined by integration of the acceleration signal; the frequency can also be determined from the acceleration signal. The acceleration sensor is fastened to (e.g., directly physically coupled to and attached to) the vibrator; other possible positions are at the leader or directly on the driving element, for instance.

The present disclosure enables a recognition of obstacles in the ground by an analysis of the acceleration signals. The acceleration signal is here observed over a time period t; the following signals can here be used for a recognition of an obstacle: the actual acceleration, the speed, and/or the distance. The following options are available:

1. The fastest method: The positive and negative half-waves are observed and compared separately from one another, with individual half-waves, but also a plurality of half-waves, being able to be used over a settable observation time period. The observation time period can be selected in dependence on the excitation frequency, for example. Measurements such as the area, the amplitude or the shape (full width half maximum) can be calculated from these half-waves by different methods. A comparison of these two measurements provides a very fast recognition efficiency.
2. A further method comprises looking for critical frequencies such as resonant frequencies of the carrier machine or others by means of a frequency analysis. These frequencies are typically lower than the actual vibration frequency and are also an indication of the ground becoming harder or of an obstacle. Looked at on its own, this method is slower than Method 1 since the required observation time period has to be larger. Alternatively, however, this method can also produce a recognition; a combination with the first method is conceivable.
3. A further method comprises the observation of the harmonic factor of one of the following signals: acceleration, speed, amplitude. After a low-pass filtering of a signal, only one frequency should still occur with harmonic vibrations; a rising harmonic factor is an indication of inelastic impacts and thus of ground that is becoming harder or of an obstacle. This method is comparable with Method 2. Looked at on its own, this method is too slow; but can support Method 1.
4. Looked at on its own, the amplitude is dependent on a plurality of factors: excitation frequency and amplitude, weight of the driving element, penetration depth, and jacket friction. A brief increase is, however, a possible additional indication of an obstacle despite the numerous dependencies.
5. In general, every deviation from a harmonic vibration in combination with at least one of the above methods can be understood as an indication of an obstacle.

Each of the above methods enables the detection of an obstacle using a simple acceleration sensor and an evaluation unit; however, Method 1 offers the fastest recognition. The analyzing of the acceleration signals can take place by means of at least one of the methods.

In accordance with the present disclosure, the acceleration signal can be analyzed using at least one of the methods and it can be determined that an obstacle is directly in front of the driving element. In a further progression, the operator is warned and/or the control intervenes in the further driving in a regulating manner (for instance, reduction of driving force, reduction of amplitude, etc.). The fastest and most reliable approach corresponds to Method 1.

Further sensors advantageously improve the prediction: the excitation frequencies of the vibrator (for example imbalances) are known (frequency, amplitude, phase) and can be compared with the acceleration signal; the interference frequencies can be modeled with known material properties of the driving element, with a known length of the driving element, and with a known penetration depth; and the oil pressure/oil amount that the vibrator needs for the driving also provides an indication of a heavier load. The actual frequencies of the vibrator, the leader, and the carrier machine are known; a resonant behavior can thus, for instance, be better recognized by a direct search for exactly these frequencies. A combination of individual methods or of all the above methods produces an improved indication of an obstacle.

In a further embodiment, it is possible to react as follows to such obstacles in dependence on the setting:

Early reduction of the imbalance adjustment to protect the vibrator and the carrier machine.

Early reduction of the driving to protect the vibrator and the carrier machine.

This kind of signal is also a good indicator for the solidity of the ground; that is, it can, for instance be used in combination with further variables (contact pressure, frequency, amplitude) as a quality feature of a pile. An exploration of the ground and of the ground layers can simultaneously be carried out for a documentation here during the driving in of the driving element.

In a further progression, it is possible to estimate how the service life of a vibrator, for instance, is reduced by obstacles by recording obstacles.

Figure 2:
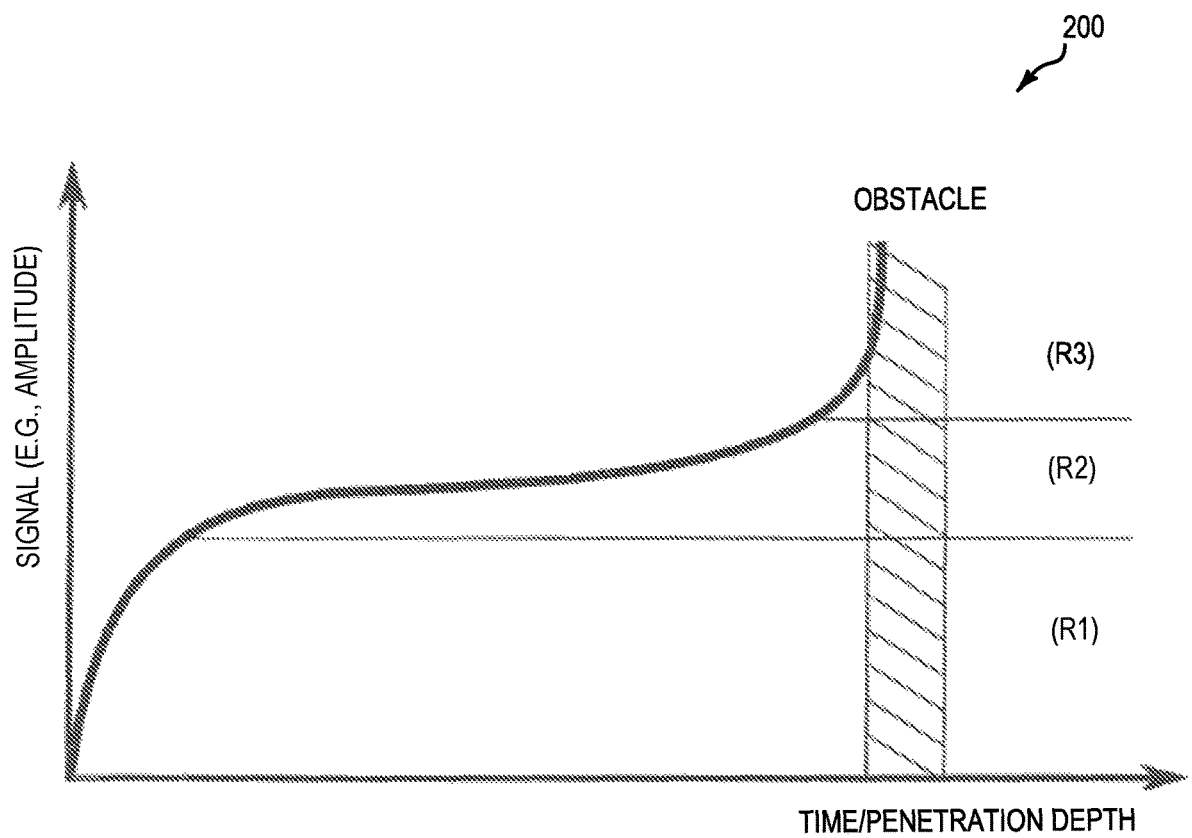
FIG. 2 shows the time development of an analyzed signal on the operation of the vibratory pile driver.

The time development of a signal when driving in a sheet pile wall is outlined in FIG. 2. The vibrator is initially ramped up; the signal already exceeds a specific value (R1 region) after a brief time. On a further penetration, this value can, for instance, increase slightly due to jacket friction (R2 region). The sheet pile wall impacts a boulder during the vibration process after approximately 10 m depth. An increase in the amplitude can already be determined briefly beforehand due to the compaction by the vibration process.

The increase in amplitude during the further driving in already allows a conclusion to be drawn on an obstacle (R3 region); the control accordingly starts to reduce the vibration amplitude and the feed force to prevent damage to the machine at an early point in time. On a direct contact with the boulder, the amplitude in the vibrator starts to rise despite the reduced amplitude due to inelastic impacts; a switching off of the machine takes place. In a further progression, the operator now has to decide how to react to the obstacle.

When planting piles in accordance with another application example, they can, for example, be fixedly positioned on a rock formation at a depth of 15 meters. In previous processes, the piles were vibrated down to the desired depth, then vibrated for so long at maximum drive force and at a high frequency until the oil pressure for driving the vibrator has exceeded a specific value. That was the indication for the operator that the pile is positioned on sufficiently solid ground. The rock can already be recognized as such in advance by an obstacle recognition; great deviations from the harmonic vibration (by any desired mathematical methods) provide the opportunity of recognizing the solidity of the rock without a great load at the vibrator and carrier machine.

Figure 3:
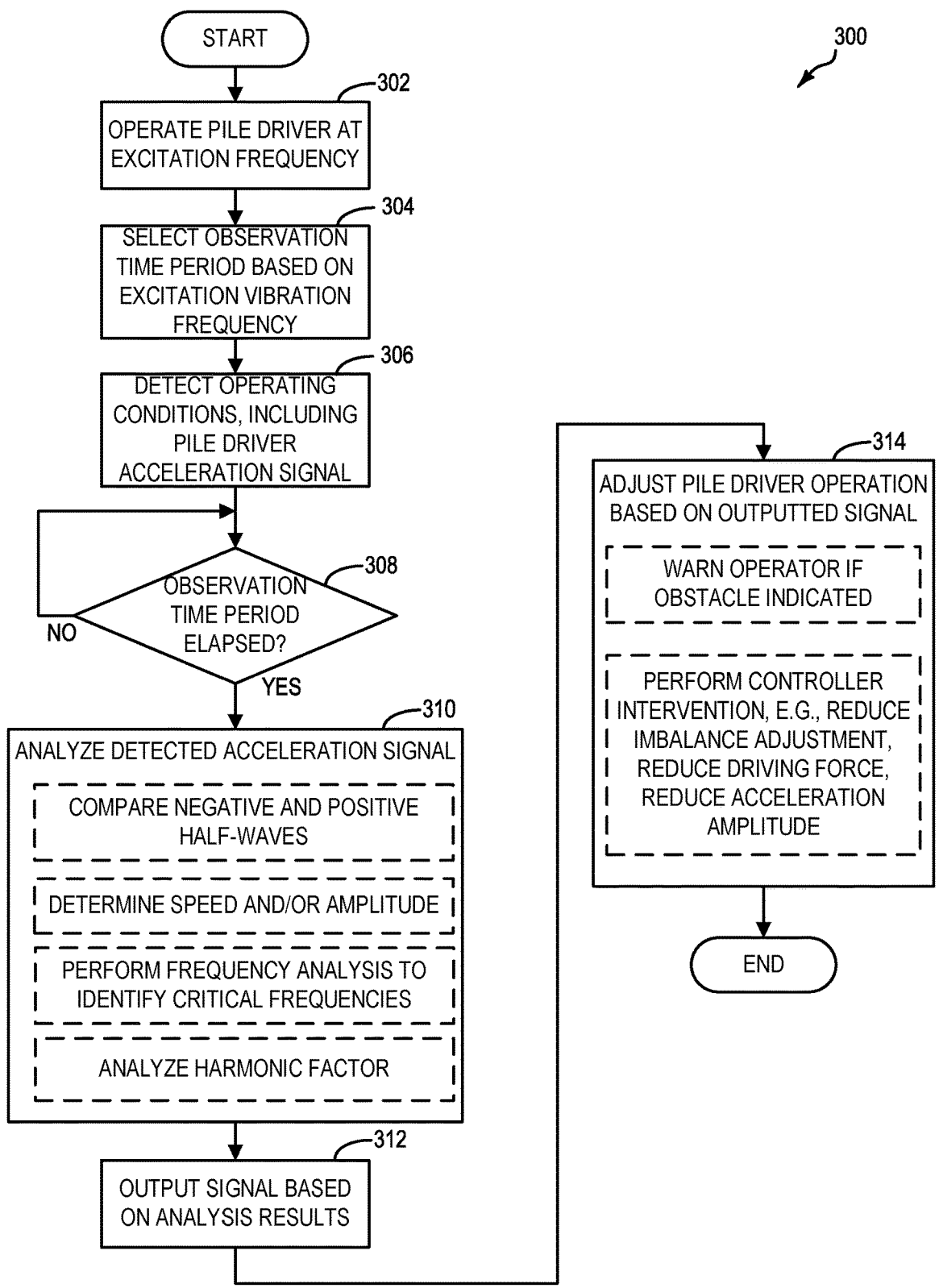
FIG. 3 shows a high level flow chart for detecting an acceleration signal during operation of a vibratory pile driver, analyzing the detected acceleration signal, and adjusting operation of the vibratory pile driver based on the results of the analysis.

FIG. 3 shows an example routine 300 for detecting an acceleration signal during operation of a vibratory pile driver (e.g., vibratory pile driver 2 of FIG. 1), analyzing the detected acceleration signal, and adjusting operation of the vibratory pile driver based on the results of the analysis. Instructions for carrying out routine 300 may be executed by a controller (e.g., controller 22 of FIG. 1) based on instructions stored on a memory of the controller and in conjunction with signals received from sensors of the system (e.g., system 10 of FIG. 1), such as the sensors described above with reference to FIG. 1. The controller may employ actuators of the system to adjust operation of the vibratory pile driver and other components of the system in accordance with routine 300.

At 302, the routine includes operating the vibratory pile driver at an excitation frequency. The excitation frequency may be a predetermined excitation frequency stored on a memory of the controller, in some examples, or may alternatively be selected by an operator of the work machine.

At 304, the routine includes selecting an observation time period based on the excitation frequency of the vibratory pile driver. In one example, the observation time period may be selected by the controller via a lookup table stored on a memory of the controller which indicates appropriate observation time periods corresponding to different excitation frequencies. Alternatively, the observation time period may be determined by the controller as a function of the excitation frequency.

At 306, the routine includes detecting operating conditions of the system, including a signal representing an acceleration of the vibratory pile driver. Further system operating conditions detected at 306 may include, for example, the feed force of the vibratory pile driver, the excitation vibration amplitude and frequency, the feed speed of the vibratory pile driver, and/or different hydraulic measurement parameters such as pressure, oil conveying amounts, etc. In the example of FIG. 1, controller 22 may detect operating conditions based on signals received from sensors 24, including a signal from an acceleration sensor/ accelerometer indicating the acceleration of the vibratory pile driver.

At 308, the routine includes determining whether the observation time period has elapsed (e.g., via a controller such as controller 22 of FIG. 1). If the answer at 308 is NO, the routine pauses until the observation time period has elapsed. If the answer at 308 is YES, the routine proceeds to 310.

At 310, the routine includes analyzing the detected acceleration signal. In one example, the analysis may be performed by a controller such as controller 22. The analysis may optionally include comparing negative and positive half-waves of the acceleration signal; determining a speed of the vibratory pile driver and/or an amplitude of the acceleration signal; performing a frequency analysis to identify critical frequencies of the vibratory pile driver; and/or analyzing a harmonic factor of the acceleration signal.

At 312, the routine includes outputting a signal (e.g., via a controller) based on the analysis results. The signal may be output to one or more actuators of the system (e.g., actuators of the vibratory pile driver itself, actuators of the work machine, and/or actuators of other components of the system). In some examples, the signal may indicate the presence of, and details regarding, an obstacle in the path of the vibratory pile driver or an obstacle which has already been struck by the vibratory pile driver.

At 314, operation of the vibratory pile driver is adjusted based on the outputted signal. This may optionally include warning an operator of an obstacle (e.g., via a visual or audible alert provided to a system operator, such as an operator of the work machine). Additionally or alternatively, this may include performing controller intervention (e.g., automatically or upon initiation by a system operator) to prevent problems associated with encountering an obstacle, reduce damage caused by encountering an obstacle, etc. In some examples, the controller intervention may include reducing imbalance adjustment, reducing a driving force of the vibratory pile driver, and/or reducing the amplitude of the acceleration of the vibratory pile driver.

After 314, the routine ends.

Note that the control and estimation routines included herein can be used with various system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of recognizing obstacles on operation of a vibratory pile driver, comprising:
   with at least one acceleration sensor, detecting an acceleration signal of the vibratory pile driver during operation by a vibratory pile operator and sending the acceleration signal to an electronic controller, wherein the detection takes place over an adjustable observation time period;
   with the controller, selecting the observation time period in dependence on an excitation frequency of the vibratory pile driver; and
   with the controller, analyzing the acceleration signal, the analysis comprising comparing negative and positive half-waves of the acceleration signal, and adjusting an actuator of the vibratory pile driver based on the analysis.

2. The method in accordance with claim 1, wherein the analysis comprises determination of a speed and/or an amplitude of the vibratory pile driver.

3. The method in accordance with claim 1, wherein the at least one acceleration sensor is arranged at the vibratory pile driver and/or at a leader and/or a driving element coupled to the vibratory pile driver.

4. The method in accordance with claim 1, wherein comparing the negative and positive half-waves comprises comparing measurements of an area, an amplitude, and/or a shape of the negative and positive half-waves.

5. The method in accordance with claim 4, wherein the shape of the negative and positive half-waves comprises a full width at half maximum of the negative and positive half-waves.

6. The method in accordance with claim 1, wherein the analysis comprises a frequency analysis looking for critical frequencies.

7. The method in accordance with claim 6, wherein the critical frequencies include resonant frequencies.

8. The method in accordance with claim 1, wherein the analysis comprises an analysis of a harmonic factor of the acceleration signal.

9. The method in accordance with claim 1, wherein adjusting the actuator of the vibratory pile driver based on the analysis comprises, responsive to the analysis indicating an obstacle, reducing an imbalance adjustment of the vibratory pile driver, reducing a driving force of the vibratory pile driver, and/or reducing an amplitude of an acceleration of the vibratory pile driver.

10. The method in accordance with claim 1, wherein adjusting the actuator of the vibratory pile driver based on the analysis comprises, responsive to the analysis indicating an obstacle, providing an alert to a system operator.

11. A system, comprising:
    a work machine comprising a hydraulic system;
    a leader directly attached to the work machine;
    a vibratory pile driver fastened to the leader and configured to transmit vibrations via clamping grips to a driving element;
    at least one acceleration sensor; and
    an electronic controller storing instructions in non-transitory memory that, when executed, cause the controller to:
       detect an acceleration signal from the at least one acceleration sensor during operation of the vibratory pile operator over an adjustable observation time period;
       select the observation time period in dependence on an excitation frequency of the vibratory pile driver;

analyze the acceleration signal, the analysis comprising comparing negative and positive half-waves of the acceleration signal; and send a signal to adjust operation of the vibratory pile driver based on the analysis.

12. The system in accordance with claim 11, wherein the at least one acceleration sensor is arranged at the vibratory pile driver, the leader, and/or the driving element.

13. The system in accordance with claim 11, wherein comparing the negative and positive half-waves comprises comparing measurements of an area, an amplitude, and/or a shape of the negative and positive half-waves, and wherein the shape of the negative and positive half-waves comprises a full width at half maximum of the negative and positive half-waves.

14. The system in accordance with claim 11, wherein the analysis comprises a frequency analysis looking for critical frequencies, and wherein the critical frequencies include resonant frequencies.

15. The system in accordance with claim 11, wherein the analysis comprises an analysis of a harmonic factor of the acceleration signal.

16. The system in accordance with claim 11, wherein sending the signal to adjust operation of the vibratory pile driver based on the analysis comprises, responsive to the analysis indicating an obstacle, sending a signal to an actuator to reduce an imbalance adjustment of the vibratory pile driver.

17. The system in accordance with claim 11, wherein sending the signal to adjust operation of the vibratory pile driver based on the analysis comprises, responsive to the analysis indicating an obstacle, sending a signal to an actuator to reduce a driving force of the vibratory pile driver and/or reduce an amplitude of an acceleration of the vibratory pile driver.

\* \* \* \* \*